United States Patent
Sayre et al.

(10) Patent No.: US 8,264,547 B1
(45) Date of Patent: Sep. 11, 2012

(54) DISPLAY CALIBRATION METHOD AND APPARATUS FOR EXPOSING ERRORS IN GAMMA MAPPING AND IMAGE SCALING

(75) Inventors: Rick Sayre, Kensington, CA (US); Rod Bogart, San Rafael, CA (US)

(73) Assignee: Pixar, Emeryville, CA (US)

( * ) Notice: Subject to any disclaimer, the term of this patent is extended or adjusted under 35 U.S.C. 154(b) by 1257 days.

(21) Appl. No.: 11/948,846

(22) Filed: Nov. 30, 2007

(51) Int. Cl.
*H04N 17/02* (2006.01)

(52) U.S. Cl. ........ 348/189; 348/180; 348/181; 348/184; 348/190; 348/191; 348/177

(58) Field of Classification Search .............. 348/647, 348/180, 181, 184, 189–191, 177; 345/611, 345/589, 597
See application file for complete search history.

(56) References Cited

U.S. PATENT DOCUMENTS

| | | | |
|---|---|---|---|
| 5,038,210 A | | 8/1991 | Deckelman et al. |
| 5,247,358 A | | 9/1993 | Richards |
| 5,699,111 A | | 12/1997 | Dairiki et al. |
| 6,025,829 A | | 2/2000 | Delucia et al. |
| 6,057,882 A | * | 5/2000 | van den Branden Lambrecht et al. ............ 348/192 |
| 6,975,332 B2 | * | 12/2005 | Arnold et al. .............. 345/611 |
| 6,999,100 B1 | * | 2/2006 | Leather et al. ............. 345/611 |
| 7,006,130 B2 | * | 2/2006 | Harshbarger et al. ....... 348/189 |
| 7,081,902 B1 | * | 7/2006 | Crow et al. ................ 345/611 |
| 2002/0196256 A1 | * | 12/2002 | Hoppe et al. ............... 345/441 |
| 2005/0206645 A1 | * | 9/2005 | Hancock .................... 345/501 |
| 2006/0203125 A1 | * | 9/2006 | Sayre ........................ 348/459 |
| 2006/0268012 A1 | * | 11/2006 | MacInnis et al. ........... 345/629 |

OTHER PUBLICATIONS

International Search Report from PCT Application No. PCT/US06/08669, dated Aug. 24, 2007.

* cited by examiner

*Primary Examiner* — Pankaj Kumar
*Assistant Examiner* — Mulugeta Mengesha
(74) *Attorney, Agent, or Firm* — Kilpatrick Townsend & Stockton LLP; Philip H. Albert

(57) ABSTRACT

Test patterns and associated techniques for testing the fidelity of intensity reproduction are disclosed. One set of embodiments provide test patterns that incorporate anti-aliased features such as anti-aliased edges or lines. In various embodiments, these anti-aliased features expose undesirable, nonlinear transformations of the test patterns by one or more devices in an image output system or chain. Using these test patterns, users may more easily evaluate the end-to-end gamma response of the system, and may more easily calibrate gamma controls accordingly. Additionally, users may more easily identify nonlinear image resampling performed in gamma, rather than linear, space.

42 Claims, 8 Drawing Sheets

DISPLAY CALIBRATION METHOD AND APPARATUS FOR EXPOSING ERRORS IN GAMMA MAPPING AND IMAGE SCALING

BACKGROUND OF THE INVENTION

Embodiments of the present invention relate to test patterns, and more particularly relate to test patterns and associated techniques for testing the fidelity of intensity reproduction in image output systems.

Conventional display devices reproduce encoded intensity values in a nonlinear fashion. For example, CRTs (Cathode Ray Tubes) exhibit a voltage (V) to intensity (I) response that corresponds to a nonlinear transfer function of the form $I \propto V^\gamma$, where the exponent $\gamma$ (gamma) is approximately 2.2. This phenomenon results in an apparent darkening of the midtones in a displayed image.

To compensate for the above effect, an inverse transfer function may be applied to a signal prior to the point of display/output. The application of this inverse transfer function, known as gamma correction, is designed to cancel out the nonlinearity introduced by the display device, and thereby produce an end-to-end (i.e., source to output) response that is approximately linear. In order to accurately control the tone scale of a displayed image such that said image accurately corresponds to the original signal, the gamma of the display/output must be accurately known. Precise gamma calibration thus plays an important role in achieving high fidelity image reproduction.

Many image output devices (e.g., televisions, computer monitors, etc.) and image output driver devices (e.g., DVD players, Blu-Ray players, HD-DVD players, digital video recorders, computers, etc.) have a user control labeled "gamma" that alters the exponent of the transfer function applied at the display device or the inverse transfer function applied through gamma correction. Thus, this control affects the end-to-end gamma response of an image output system or chain. Many devices without such a labeled control still provide other controls which directly or indirectly affect end-to-end gamma response.

A common type of test pattern that is used to aid in the visual adjustment of gamma comprises an area of alternating white (100% intensity) and black (0% intensity) and an area of continuous gray (e.g., 50% intensity). This pattern relies on the low-pass filtering effects of distance on the human visual system to "fuse," in the mind of the viewer, the area of white/black into a single intermediate intensity. This intermediate intensity is then compared to the area of continuous gray to determine whether the intensity of the continuous gray is correct.

One problem with the above pattern is that the comparison of the area of white/black with the area of continuous gray only tests, or samples, a single point on a gamma curve. While multiple pairs of white/black and grey areas may be incorporated to test different intermediate intensities on a single pattern, the number of sample points will still be relatively limited. Additionally, certain display types reproduce varying intensities for white and black depending on the amount of white and black in the displayed image. Making such comparisons may also be difficult for some viewers, especially for large-screen displays. As a result, the pattern described above may not allow for an accurate adjustment of gamma for all types of images/scenes.

BRIEF SUMMARY OF THE INVENTION

Embodiments of the present invention address the foregoing and other such problems by providing improved test patterns and associated techniques for testing the fidelity of intensity reproduction. One set of embodiments provide test patterns that incorporate anti-aliased features such as anti-aliased edges or lines. In various embodiments, these anti-aliased features expose undesirable, nonlinear transformations of the test patterns by one or more devices in an image output system or chain. Using these test patterns, users may more easily evaluate the end-to-end gamma response of the system, and may more easily calibrate gamma controls accordingly. Additionally, users may more easily identify nonlinear image resampling performed in gamma, rather than linear, space. Image resampling may include image resizing and the like.

According to one embodiment of the present invention, a method for testing the fidelity of intensity reproduction in an image output system including an image output device and one or more other devices comprises receiving a representation of a test pattern, where the test pattern includes a one or more anti-aliased features. In various embodiments, the one or more anti-aliased features are configured to provide visual evidence of a nonlinear transformation of the test pattern by the image output device or the one or more other devices.

In some embodiments, the method further comprises outputting the test pattern and receiving, in response to viewing the outputted test pattern, an adjustment of one or more image processing controls, where the adjustment of the one or more image processing controls is intended to reduce the visual evidence of the nonlinear transformation.

In one set of embodiments, the nonlinear transformation corresponds to a gamma transformation of the test pattern (e.g., gamma correction). In another set of embodiments, the nonlinear transformation corresponds to image resampling of the test pattern in nonlinear (i.e., gamma) space. Image resampling may include, for example, image resizing, and other types of resampling operations.

In one set of embodiments, the one or more anti-aliased features include a first anti-aliased edge, where the first anti-aliased edge is slanted at an angle between a horizontal axis and a vertical axis of an output area of the image output device, and where the evidence of the nonlinear transformation corresponds to visible aliasing of the first anti-aliased edge.

In further embodiments, the one or more anti-aliased features further include a second anti-aliased edge parallel to the first anti-aliased edge, where the first anti-aliased edge and the second anti-aliased edge form a first anti-aliased line, and where the evidence of the nonlinear transformation corresponds to intensity variations along the first anti-aliased line.

In yet further embodiments, the one or more anti-aliased features further include a second anti-aliased line parallel to the first anti-aliased line, where the evidence of the nonlinear transformation corresponds to artifacts caused by intensity variations along the first and second anti-aliased lines. In some embodiments, the artifacts appear as bands of substantially identical intensity oriented substantially perpendicular to the first and second anti-aliased lines. In one set of embodiments, the test pattern is animated such that an interline spacing between the first and second anti-aliased lines cyclically expands and contracts over time. This expansion and contraction caused a visible rotation of the band described above.

According to another embodiment of the present invention, a method for testing the fidelity of intensity reproduction in an image output system including an image output device and one or more other devices comprises receiving a representation of a test pattern, where the test pattern is configured to exhibit low-frequency artifacts across substantially all of an output area of the image output device in response to a nonlinear transformation of the test pattern by the image output device or the one or more other devices. In some embodiments, the low-frequency artifacts change over time.

According to another embodiment of the present invention, an apparatus for testing the fidelity of intensity reproduction in an image output system including an image output device and one or more other devices is disclosed. The apparatus comprises a processing component configured to generate a representation of a test pattern, where the test pattern includes a one or more anti-aliased features. In various embodiments, the one or more anti-aliased features are configured to provide visual evidence of a nonlinear transformation of the test pattern by the image output device or the one or more other devices.

According to another embodiment of the present invention, a machine-readable medium is disclosed, where the machine-readable medium has stored thereon a representation of a test pattern, and where the test pattern is configured to be outputted by an image output system comprising an image output device and one or more other devices. In various embodiments, the test pattern includes one or more anti-aliased features, and the one or more anti-aliased features are configured to provide visual evidence of a nonlinear transformation of the test pattern by the image output device or the one or more other devices.

In one set of embodiments, the representation of the test pattern includes a plurality of instructions which, when executed by a processing component, cause the processing component to generate the test pattern.

BRIEF DESCRIPTION OF THE DRAWINGS

In order to more fully understand the present invention, reference is made to the accompanying drawings. Understanding that these drawings are not to be considered limitations on the scope of the invention, the presently described embodiments and the presently understood best mode of the invention are described with additional detail through use of the accompanying drawings.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Figure 1:
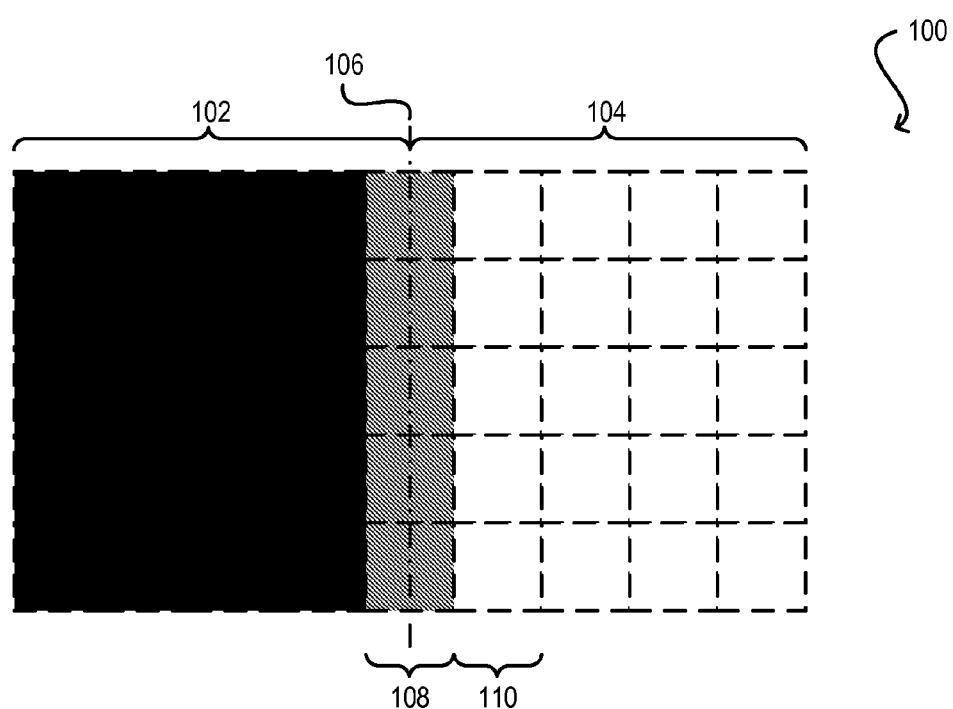
FIG. 1 provides a zoomed-in view of a first test pattern in accordance with an embodiment of the present invention.

FIG. 1 provides a zoomed-in view of a first test pattern 100 in accordance with an embodiment of the present invention. In particular, FIG. 1 depicts an 5 by 9 pixel grid representing a 5 by 9 pixel portion of test pattern 100. This enlarged view is provided to more clearly illustrate the intensity value of each pixel. It should be appreciated that the illustrated grid lines represent pixel boundaries and are not a part of the test pattern. It should also be appreciated that test pattern 100 may be larger or smaller (in pixel dimensions) than the portion illustrated.

In one set of embodiments, test pattern 100 (or an encoded version thereof) may be stored on a machine-readable medium including but not limited to RAM, ROM, EEPROM, flash memory, CD-ROM, DVD-ROM, Blu-Ray Disc, HD-DVD or other optical storage, magnetic cassettes, magnetic tape, and magnetic disk storage or other magnetic storage. In other embodiments, test pattern 100 may be generated in real-time by a signal-generating device such as a dedicated test signal generator, DVD player, Blu-Ray Disc player, HD-DVD player, digital video recorder. cable decoder box, video game console, personal computer, or the like. One of ordinary skill in the art would recognize many variations, modifications, and alternatives.

As shown, test pattern 100 includes an area of 0% intensity (i.e., black) 102 and an area of 100% intensity (i.e., white) 104. Areas 102 and 104 are divided by a sub-pixel edge 106. In various embodiments, sub-pixel edge 106 is anti-aliased, resulting in a linearly filtered column of pixels 108. In one set of embodiments, edge 106 is anti-aliased analytically; in other words, the intensity of each pixel underlying edge 106 is computed based on the exact area coverage of the pixel. In the example of FIG. 1, all of the pixels in column 108 are covered exactly 50% by 0% intensity area 102 and 50% by 100% intensity area 104. Accordingly, all of the pixels have an intensity value of 0.5 (normalized on a scale of zero to unity). In other embodiments, edge 106 may be anti-aliased using other techniques, such as point sampling methods (e.g., supersampling, multisampling, etc.). One of ordinary skill in the art would recognize many variations, modifications, and alternatives.

The inventors of the present invention have realized that an anti-aliased edge such as edge 106 will sweep out all possible intensity values between zero and unity as it moves left-to-right (or right-to-left) across a pixel column. For example, assuming edge 106 moves left-to-right across pixel column 108, the intensities of the pixels in column 108 will decrease and reach zero when edge 106 reaches the right edge of column 108. Further, as edge 106 moves across the next pixel column 110, the intensities of the pixels in column 110 will start at 1 (when edge 106 is positioned at the left edge of column 110) and decrease to zero (when edge 106 reaches the right edge of the column 110).

Accordingly, in various embodiments, test pattern 100 is advantageously configured to animate edge 106 in this manner. If the end-to-end gamma response of the system outputting test pattern 100 is linear, this animation will result in a smooth fading effect as the intensities of each successive pixel column rise and fall (or vice versa) according to a triangle wave. If the end-to-end gamma response of the system is nonlinear (indicating an uncorrected nonlinear transformation somewhere in the system/chain), edge 106 will appear to shimmer as it moves. In this manner, users can determine whether the intensity values of test pattern 100 are being reproduced accurately.

It should be appreciated that edge 106 does not have to be oriented vertically. In an alternative embodiment, edge 106 may be oriented horizontally, and may be configured to move from the top of the pixel grid to the bottom, or vice versa. In this case, the animation of edge 106 would result in a fading of pixel rows rather than pixel columns. Additionally, test pattern 100 may incorporate more than one edge, and the one or more edges may be configured to animate at varying speeds and in varying ways For example, the one or more edges may be configured to rotate rather than being translated horizontally or vertically. One of ordinary skill in the art would recognize many variations, modifications, and alternatives.

Figure 2:
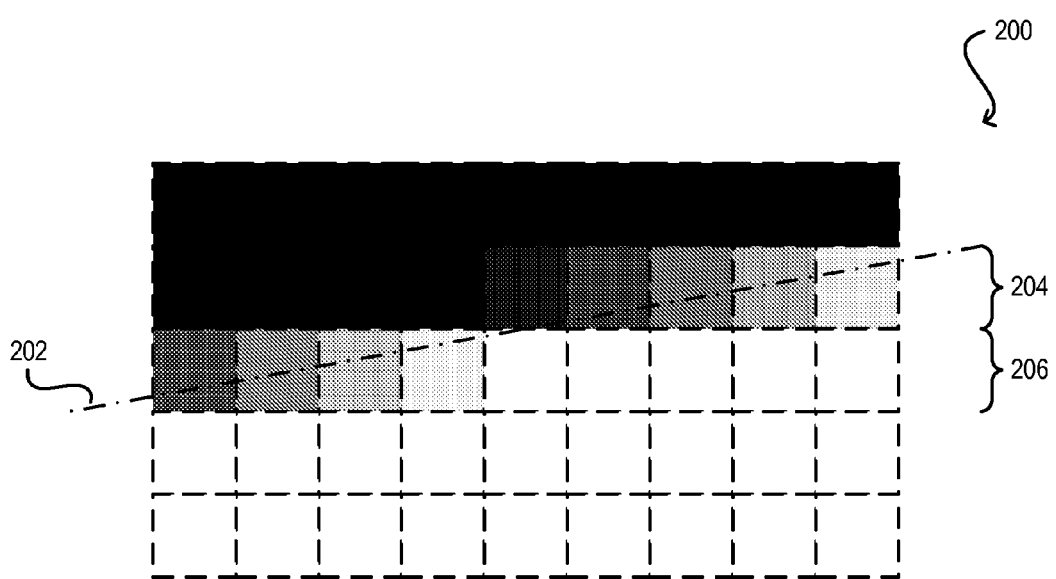
FIG. 2 provides a zoomed in view of a second test pattern in accordance with an embodiment of the present invention.

FIG. 2 provides a zoomed-in view of a second test pattern 200 in accordance with an embodiment of the present invention. In particular, FIG. 2 depicts an 5 by 9 pixel grid representing a 5 by 9 pixel portion of test pattern 200. Like FIG. 1, this enlarged view is provided to more clearly illustrate the intensity value of each pixel. It should be appreciated that the illustrated grid lines represent pixel boundaries and are not a part of the test pattern. It should also be appreciated that test pattern 200 may be larger or smaller (in pixel dimensions) than the portion illustrated.

In one set of embodiments, test pattern 200 (or an encoded version thereof) may be stored on a machine-readable medium including but not limited to RAM, ROM, EEPROM, flash memory, CD-ROM, DVD-ROM, Blu-Ray Disc, HD-DVD or other optical storage, magnetic cassettes, magnetic tape, and magnetic disk storage or other magnetic storage. In other embodiments, test pattern 200 may be generated in real-time by a signal-generating device such as a dedicated test signal generator, DVD player, Blu-Ray Disc player, HD-DVD player, digital video recorder. cable decoder box, video game console, personal computer, or the like. One of ordinary skill in the art would recognize many variations, modifications, and alternatives.

Like FIG. 1, FIG. 2 includes an area of 0% intensity, an area of 100% intensity, and a sub-pixel edge 202 dividing the two. Unlike FIG. 1 however, sub-pixel edge 202 is slanted with respect to a horizontal and vertical axis of the pixel grid. The inventors of the present invention have realized that positioning an edge off-axis (as in FIG. 2) results in different area coverage percentages for each pixel underlying the edge. As a result, applying anti-aliasing to such an edge allows for the simultaneous display of multiple intensity values along the range of zero to unity. For example, the pixels in rows 204 and 206 exhibit varying levels of intensity according to their respective area coverage percentages. This allows users to evaluate the linearity of a system's gamma response using a static, rather than animated, pattern.

In various embodiments, if the end-to-end gamma response of the system outputting test pattern 200 is linear, edge 202 will appear as a smoothly anti-aliased edge. If the end-to-end gamma response is nonlinear (indicating an uncorrected nonlinear transformation somewhere in the system/chain), edge 202 will appear visibly jagged.

In one set of embodiments, edge 202 is slanted at an angle that is slightly off of the horizontal or vertical axis of a pixel grid. For example, edge 202 may be slanted at an angle close to zero degrees or close to 90 degrees. The inventors of the present invention have realized that such orientations maximize the number of distinct pixel intensity values generated by the edge when it is anti-aliased. In other embodiments, edge 202 may be slanted at an arbitrary angle.

In further embodiments, edge 202 may be configured to move across the pixel grid. For example, the edge may be configured to move from the top of the pixel grid to the bottom, or vice versa. If the end-to-end gamma response is nonlinear, the anti-aliased edge will appear to shimmer as it moves.

Figure 3:
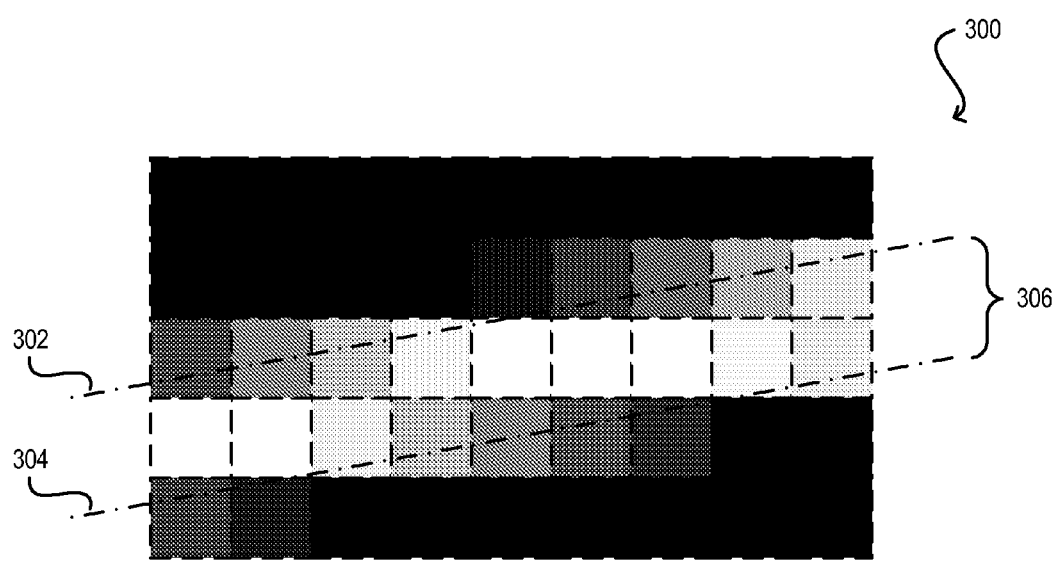
FIG. 3 provides a zoomed-in view of a third test pattern in accordance with an embodiment of the present invention.

FIG. 3 provides a zoomed-in view of a third test pattern 300 in accordance with an embodiment of the present invention. In particular, FIG. 3 depicts an 5 by 9 pixel grid representing a 5 by 9 pixel portion of test pattern 300. Like FIGS. 1 and 2, this enlarged view is provided to more clearly illustrate the intensity value of each pixel. It should be appreciated that the illustrated grid lines represent pixel boundaries and are not a part of the test pattern. It should also be appreciated that test pattern 300 may be larger or smaller (in pixel dimensions) than the portion illustrated.

In one set of embodiments, test pattern 300 (or an encoded version thereof) may be stored on a machine-readable medium including but not limited to RAM, ROM, EEPROM, flash memory, CD-ROM, DVD-ROM, Blu-Ray Disc, HD-DVD or other optical storage, magnetic cassettes, magnetic tape, and magnetic disk storage or other magnetic storage. In other embodiments, test pattern 300 may be generated in real-time by a signal-generating device such as a dedicated test signal generator, DVD player, Blu-Ray Disc player, HD-DVD player, digital video recorder. cable decoder box, video game console, personal computer, or the like. One of ordinary skill in the art would recognize many variations, modifications, and alternatives.

As shown, test pattern 300 includes two sub-pixel edges 302 and 304. Edges 302 and 304 are anti-aliased and oriented substantially parallel to each other, thereby defining an anti-aliased line 306. In the example illustrated, the area within line 306 (i.e., the area bounded by edges 302, 304) is configured to have 100% intensity, and the areas outside line 306 are configured to have 0% intensity. However, in other embodiments, the area within line 306 may be configured to have 0% intensity, the areas outside line 306 may be configured to have 100% intensity. Additionally, although line 306 is shown as being slanted at similar angle to edge 202 of FIG. 2, it should be appreciated that line 306 may be slanted at any angle. Likewise, although intensities of 0% and 100% are shown in FIG. 2, it should be appreciated that other intensities or colors may be used. One of ordinary skill in the art would recognize many variations, modifications, and alternatives.

In various embodiments, if the end-to-end gamma response of a system outputting test pattern 300 is linear, line 306 will appear as a smoothly anti-aliased line. If the end-to-end gamma response is nonlinear (indicating an uncorrected nonlinear transformation somewhere in the system/chain), line 306 will appear to have intensity variations along the length of the line. In some embodiments, these intensity variations will appear as alternating sections of lighter and darker areas.

In one set of embodiments, the width of line 306 may be greater than the width of a unit of the fixed-resolution grid to which it is rendered (i.e., a pixel). For example, the width of line 306 may greater than the width of a pixel and less then the width of two pixels. This ensures that at least one pixel of line 306 has an intensity value of unity (e.g., white). In another set of embodiments, the width of line 306 may be an arbitrary size. One of ordinary skill in the art would recognize many variations, modifications, and alternatives.

Figure 4A:
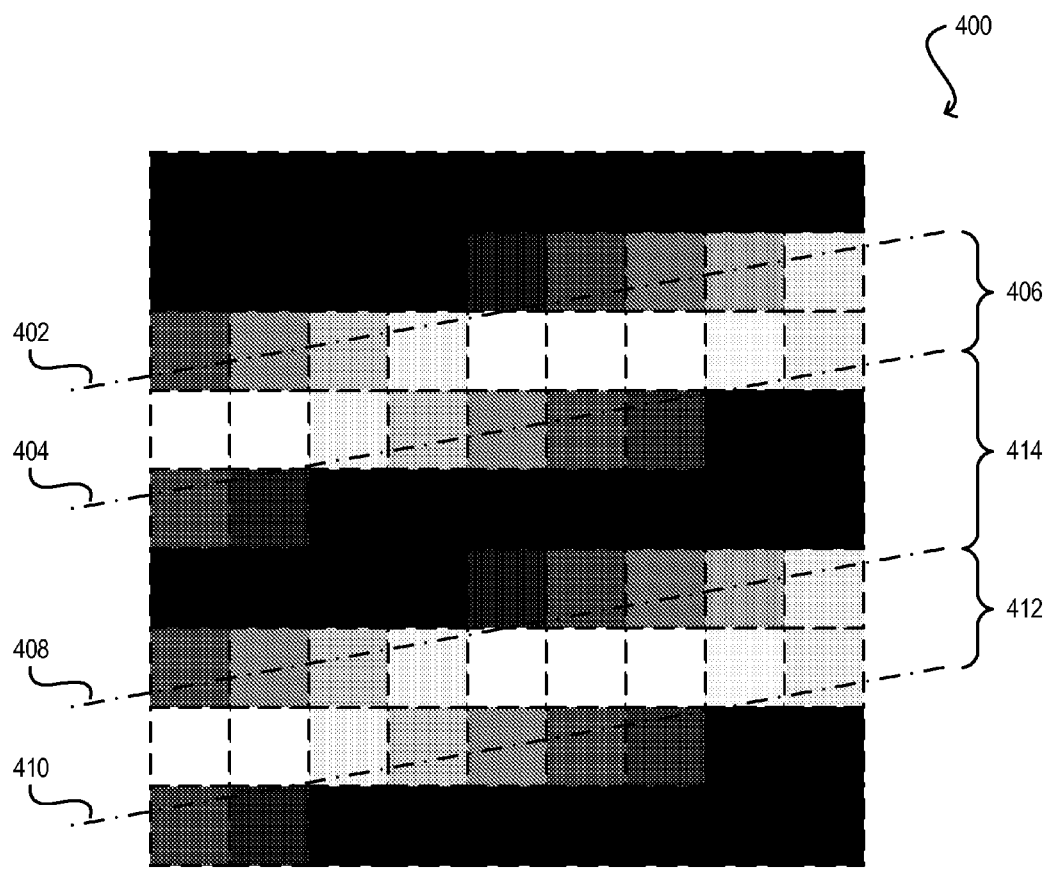
FIGS. 4A and 4B provide zoomed-in views of a fourth test pattern in accordance with an embodiment of the present invention.
Figure 4B:
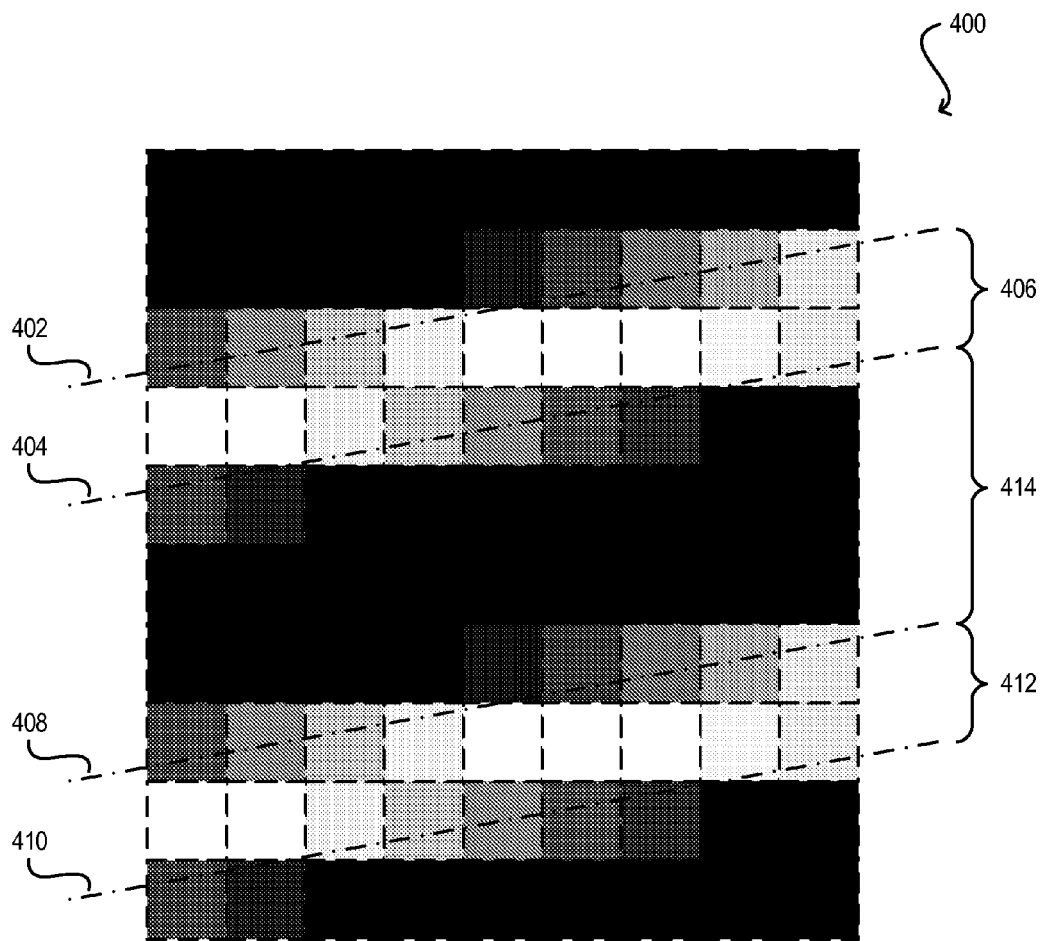

FIGS. 4A and 4B provide zoomed-in views of a fourth test pattern 400 in accordance with an embodiment of the present invention. In particular, FIG. 4A depicts a 9 by 9 pixel grid representing a 9 by 9 pixel portion of test pattern 400, and FIG. 4B depicts a 10 by 9 pixel grid representing a 10 by 9 portion of test pattern 400. Like FIGS. 1, 2, and 3, these enlarged views are provided to more clearly illustrate the intensity value of each pixel. It should be appreciated that the illustrated grid lines represent pixel boundaries and are not a part of the test pattern. It should also be appreciated that test pattern 400 may be larger or smaller (in pixel dimensions) than the portions illustrated.

In one set of embodiments, test pattern 400 (or an encoded version thereof) may be stored on a machine-readable medium including but not limited to RAM, ROM, EEPROM, flash memory, CD-ROM, DVD-ROM, Blu-Ray Disc, HD-DVD or other optical storage, magnetic cassettes, magnetic tape, and magnetic disk storage or other magnetic storage. In other embodiments, test pattern 400 may be generated in real-time by a signal-generating device such as a dedicated test signal generator, DVD player, Blu-Ray Disc player, HD-DVD player, digital video recorder. cable decoder box, video game console, personal computer, or the like. One of ordinary skill in the art would recognize many variations, modifications, and alternatives.

As shown, test pattern 400 includes a first anti-aliased line 406 (defined by anti-aliased edges 402, 404) and a second anti-aliased line 412 (defined by anti-aliased edges 408, 410). In various embodiments, lines 406 and 412 exhibit characteristics similar to line 306 of FIG. 3. For example, lines 406 and 412 may be rendered slightly off-axis with respect to a horizontal axis or a vertical axis of a pixel grid. Although only two lines are depicted, it should be appreciated that any number of lines may be included in test pattern 400.

In one set of embodiments, lines 406 and 412 are positioned substantially parallel to each other, and are spaced apart according to an interline spacing 414. If the end-to-end gamma response of a system outputting test pattern 400 is linear, lines 406 and 412 will appear as smoothly anti-aliased lines. However, if the end-to-end gamma response is nonlinear, lines 406 and 412 will appear to have intensity variations along the length of each line. If interline spacing 414 is sufficiently small, these intensity variations will result in low-frequency artifacts that appear as bands of nearly identical intensity, where the bands are oriented substantially perpendicular to lines 406 and 412.

In an exemplary embodiment, interline space 414 is approximately 1+t pixels wide, where t is a relatively small number. In some embodiments, the value of t may be dependent on the width of lines 406 and 412. In other embodiments, t may be a fixed value, such as 0.5, 1, or 2. In yet other embodiments, interline spacing 414 may be any width that is sufficient to display low-frequency artifacts when test pattern 400 is reproduced nonlinearly as mentioned above. One of ordinary skill in the art would recognize many variations, modifications, and alternatives.

In various embodiments, test pattern 400 may be animated such that interline spacing 414 cyclically expands and contracts over time. For example, FIG. 4B illustrates an alternative configuration of lines 406 and 412 wherein interline spacing 414 has expanded by a width of less than one pixel. In various embodiments, if the end-to-end gamma response of a system outputting test pattern 400 is linear, this animation of interline spacing 414 will be barely perceptible. In contrast, if the end-to-end gamma response is nonlinear, the low-frequency artifacts discussed with respect to FIG. 4A will be visible. Additionally, the animation of interline spacing 414 will induce a phase shift between the intensity variations along lines 406 and 412, causing the aforementioned bands of nearly identical intensity to visibly rotate. Thus, users can more easily determine whether the intensity values of test pattern 400 are being reproduced correctly (i.e., whether system gamma response is linear).

In one set of embodiments, interline spacing 414 may have a width of t pixels, wherein t varies from $\epsilon_0 - \epsilon_1$ to $\epsilon_0 + \epsilon_1$ over time. In one embodiment, $\epsilon_{0_1}$ is 2.1 and $\epsilon_1$ is 0.01. In alternative embodiments, interline spacing 414 may be configured to expand and/or contract any other amount that generates the rotation effect described above. One of ordinary skill in the art would recognize many variations, modifications, and alternatives.

Figure 5:
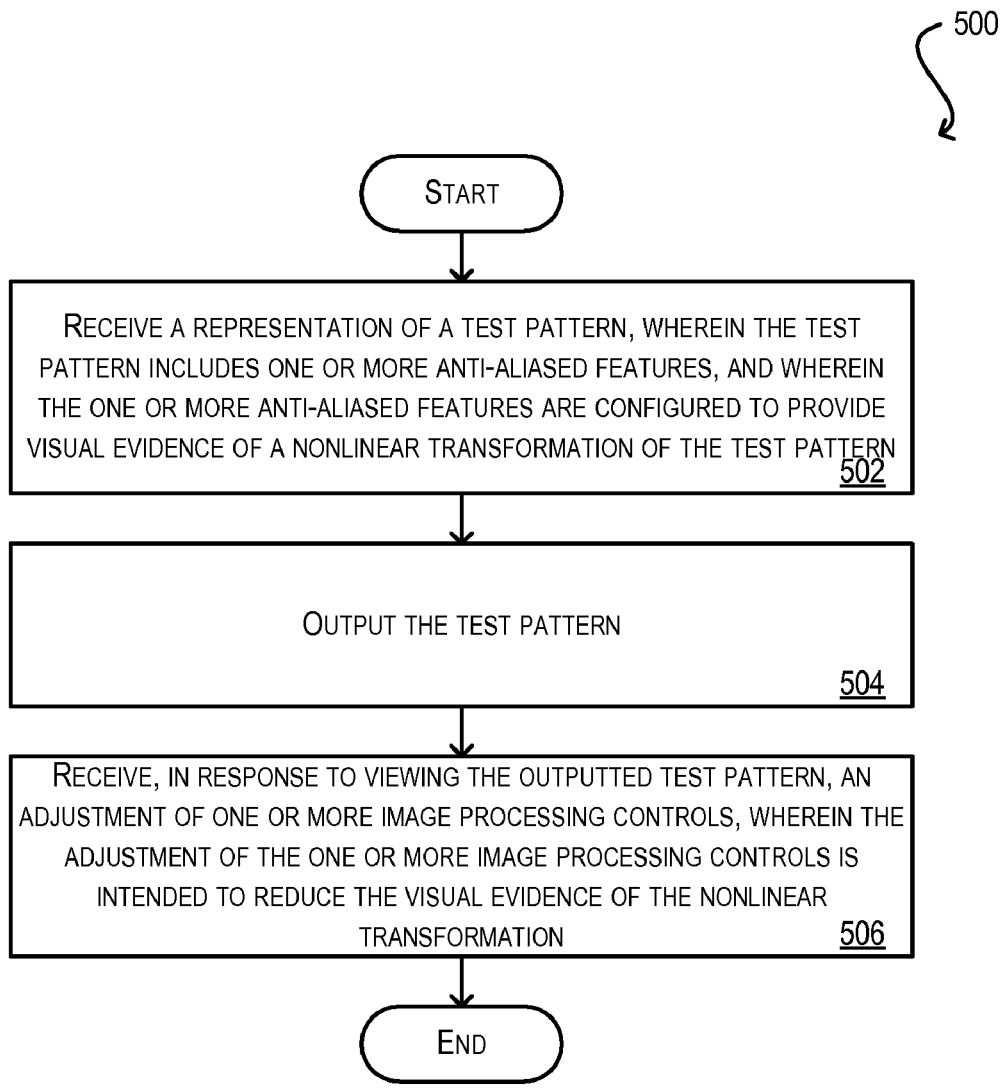
FIG. 5 is a flowchart of the steps performed in adjusting one or more image processing controls in accordance an embodiment of the present invention.

FIG. 5 is a flowchart 500 of the steps performed in using a test pattern such as pattern 400 to adjust image processing controls of a device in an image output system in accordance with an embodiment of the present invention. In one set of embodiments, the device may be an image output device such as a computer monitor, television, video projector, or the like. In alternative embodiments, the device may be any other device in an image output system or chain, such as a DVD player, Blu-Ray Disc player, HD-DVD player, computer, or the like. Further, the processing of flowchart 500 may be implemented in software modules executed by a processor, hardware modules, or combinations thereof. The software modules may be stored on a machine-readable medium. One of ordinary skill in the art would recognize many variations, modifications, and alternatives.

At step 502, a representation of a test pattern is received, wherein the test pattern includes one or more anti-aliased features, and wherein the one or more anti-aliased features are configured to provide visual evidence of a nonlinear transformation of the test pattern. In one set of embodiments, the received test pattern may be a pattern similar to test pattern 400. For example, test pattern 400 includes a plurality of anti-aliased features (anti-aliased lines 406 and 412) that are configured to display a rotation effect that indicates a nonlinear transformation of the test pattern. Alternatively, the received test pattern may be a pattern similar to test patterns 100, 200, or 300 of FIGS. 1, 2, and 3 respectively.

In one embodiment, the nonlinear transformation may be a gamma transformation (e.g., gamma correction) of the test pattern. For example, a device in an image output system may apply a gamma correction to a signal that is not completely canceled out by the gamma expansion that occurs at the point of display. Alternatively, no gamma correction may be applied to the signal, resulting in an uncompensated gamma expansion at the point of display. In either case, the end-to-end gamma response of the system will be nonlinear.

In another embodiment, the nonlinear transformation may correspond to image resampling of the test pattern in nonlinear (i.e., gamma) space. Generally speaking, linear operations such as image resampling performed on a gamma corrected signal in gamma space will result in nonlinear changes to the signal after the signal is gamma expanded. Test patterns 100, 200, 300, and 400 will expose this type of incorrect scaling by exhibiting artifacts similar to those that appear when the gamma response of an outputting system is nonlinear.

At step 504, the test pattern is outputted. Assuming that the gamma of a device in the system is not correctly calibrated, an adjustment of one or more image processing controls (e.g., gamma control) is received (506). In various embodiments, the adjustment is intended to reduce the visible evidence of the nonlinear transformation. For example, with respect to test pattern 400, the adjustment may be intended to reduce the low-frequency artifacts described above. If the evidence of the nonlinear transformation is substantially reduced or disappears, the gamma control of the device is set correctly. This also indicates that the end-to-end gamma response of the system is approximately linear. Step 506 may be repeated multiple times until this result is achieved.

It should be appreciated that the specific steps illustrated in FIG. 5 provide a particular method for using a test pattern to adjust image processing controls of a device in an output system according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
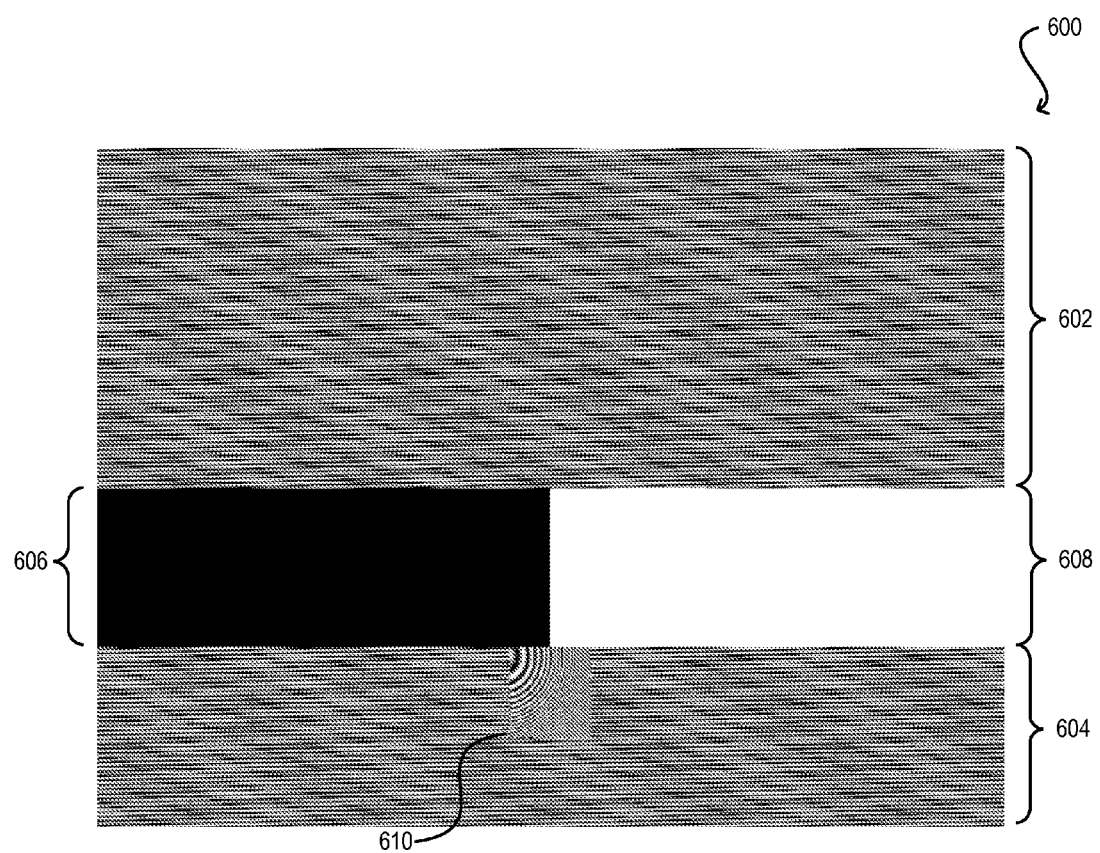
FIG. 6 illustrates a fifth test pattern in accordance with an embodiment of the present invention.

FIG. 6 illustrates a fifth test pattern 600 in accordance with an embodiment of the present invention. In one set of embodiments, test pattern 600 (or an encoded version thereof) may be stored on a machine-readable medium including but not limited to RAM, ROM, EEPROM, flash memory, CD-ROM, DVD-ROM, Blu-Ray Disc, HD-DVD or other optical storage, magnetic cassettes, magnetic tape, and magnetic disk storage or other magnetic storage. In other embodiments, test pattern 600 may be generated in real-time by a signal-generating device such as a dedicated test signal generator, DVD player, Blu-Ray Disc player, HD-DVD player, digital video recorder. cable decoder box, video game console, personal computer, or the like. One of ordinary skill in the art would recognize many variations, modifications, and alternatives.

Test pattern 600 represents an alternative version of test pattern 400 of FIG. 4. Specifically, test pattern 600 includes regions of anti-aliased lines 602, 604 corresponding to lines 406 and 412 of FIG. 4. In various embodiments, the lines of test pattern 600 retain the characteristics described for test pattern 400 (e.g., animation of interline spacing). Accordingly, errors in intensity reproduction (i.e., nonlinear gamma response) may be easily perceived, and the gamma control of one or more devices may be adjusted accordingly.

In various embodiments, test pattern 600 may include additional regions for adjusting other image processing controls. For example, as illustrated, test pattern 600 includes a region 606 for adjusting a brightness (or black level) control and a region 608 for adjusting a contrast (or picture) control. Test pattern 600 also includes a zone plate 610 for adjusting sharpness. In this manner, a single test pattern may be used to calibrate a number of different controls. Although regions 602, 604, 606, 608, 610 are illustrated in a particular configuration, it should be appreciated that these regions may be positioned in any other configuration. Further, one or more of regions 602, 604, 606, 608, 610 may be removed, and additional regions may be added. One of ordinary skill in the art would recognize many variations, modifications, and alternatives.

Although not depicted, one embodiment of test pattern 600 may include multiple regions of anti-aliased lines (such as regions 602, 604 of FIG. 6), wherein each region is configured to exhibit low-frequency artifacts unless the system gamma of the output system through which the pattern is output is a specific value. For example, one region may be configured to display artifacts unless system gamma is 1.8, another region may be configured to display artifacts unless system gamma is 2.0, and so on. Using this type of pattern, the various regions of anti-aliased lines will exhibit low frequency artifacts, except for the one region corresponding to the current system gamma of the output system, thereby enabling quick determination of current system gamma.

Figure 7:
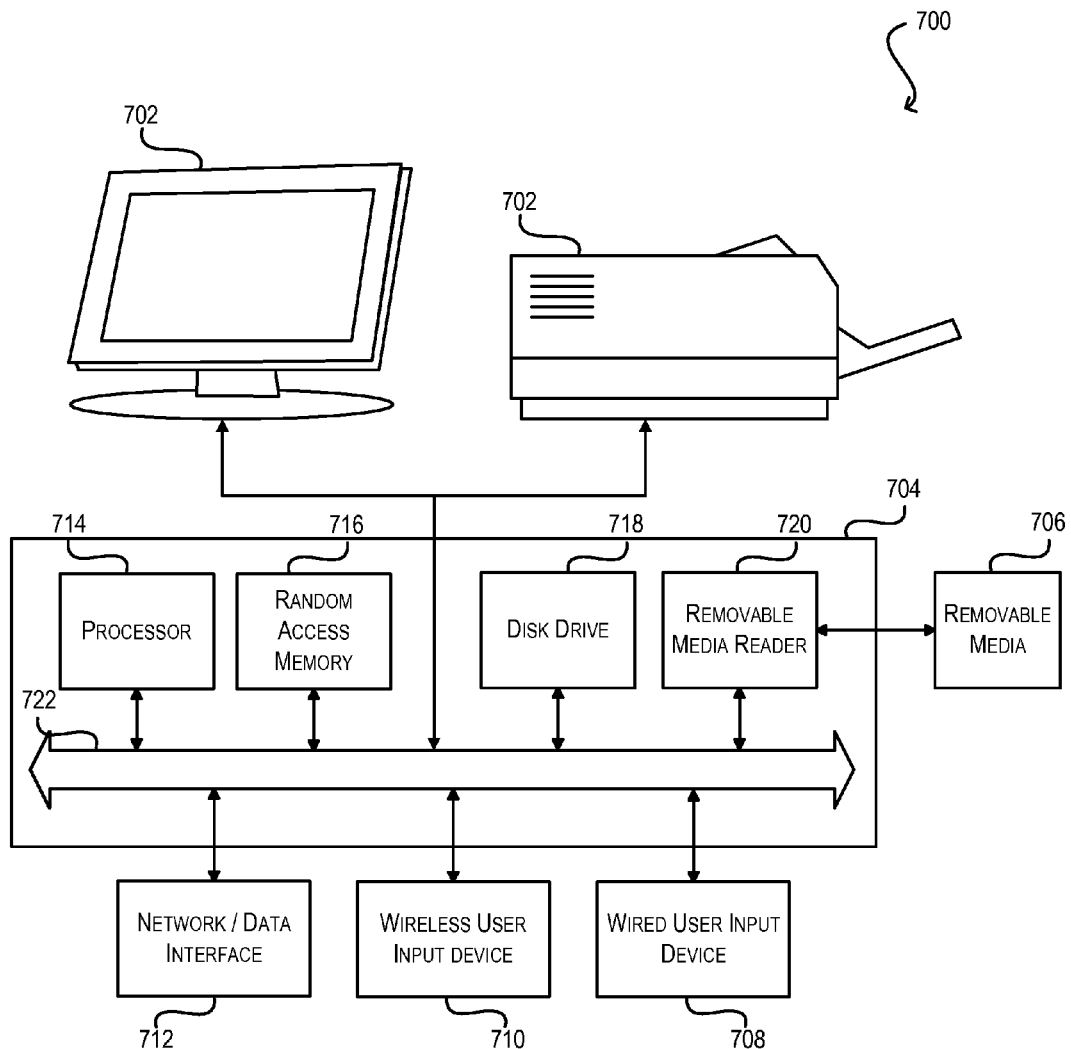
FIG. 7 is a block diagram of an image output system that may be used in accordance with an embodiment of the present invention.

FIG. 7 is a block diagram of an exemplary image output system 700 that may be used in accordance with an embodiment of the present invention. As shown, image output system 700 includes an image output driver 704 communicatively coupled with one or more image output devices 702. In various embodiments, image output driver 704 may also be communicatively coupled with a variety of user input devices 708, 710, removable media 706, and one or more other devices via network/data interface 712.

Image output device 702 is any type of device capable of outputting an image in tangible or intangible form. In one set of embodiments, image output device 702 is a video display device. For example, image output device 702 may be a direct-view display such as a CRT display, plasma display, LCD display, OLED display, or the like, a front-projection display such as a DLP projector, LCD projector, CRT projector, or the like, or a rear-projection display such as a DLP rear-projection display, LCD rear-projection display, LCoS rear-projection display, CRT rear-projection display, or the like.

In another set of embodiments, image output device 702 is a printing device. For example, image output device 702 may be a laser printer, inkjet printer, copier, fax machine, multifunction device (MFD), offset printing press, or the like.

In various embodiments, image output device 702 is configured to output a test pattern in accordance with the present invention. In one embodiment, the test pattern (or a representation thereof) is received from image output driver 704. Image output device 702 may be further configured to receive one or more inputs for adjusting one or more controls of the image output device, thereby calibrating the gamma of the device.

Image output driver 704 is any type of device capable of outputting a signal representative of an image to an image output device such as image output device 702. In one embodiment, image output driver 704 may correspond to a standalone device such as an optical disc-based media player (e.g., CD, DVD, Blu-Ray Disc, HD-DVD, etc.), a hard disk-based media player (e.g., digital video recorder, etc.), a cable decoder box, a media center or media extender (e.g., AppleTV, media center PC, etc.), a personal computer, a dedicated test signal generator, a video game console (e.g., Xbox 360, Playstation 3, Wii, etc.), a hand-held device (e.g., PDA, iPod, PSP, Zune, etc.), a video cassette player, or the like. In other embodiments, image output driver 704 may be considered a component within a device, such as a hardware circuit or an auxiliary processing board (e.g., graphics processor unit or video card). In various embodiments, image output driver 704 may be local to, or remote from, image output device 702. For example, image output driver 704 may be a DVD player that is situated next to image output device 702. Alternatively, image output driver 704 may be a test signal generator located in a broadcasting station many miles away from image output device 702.

In one set of embodiments, image output driver 704 may be configured to retrieve or generate a gamma compressed signal representing a test pattern, and transmit the signal to image output device 702. Accordingly, image output driver 704 may have one or more controls for adjusting the level of gamma correction applied to the signal. Image output device 702 may then be configured to gamma expand the signal from nonlinear space to linear space. In another set of embodiments, image output driver 704 may be configured receive a test signal, scale the signal, and transmit the scaled signal to image output device 702.

As shown in FIG. 7, image output driver 704 may include one or more processors 714 and one or more volatile memory storage areas such as a random access memory (RAM) 716. Random access memory 716 may be configured to store one or more computer programs for execution by processor 714, such as a program configured to generate a test pattern in accordance with embodiments of the present invention.

Image output driver 704 may further include one or more nonvolatile memory storage areas such as disk drives 718, a removable media reader 720 (providing access to removable media 706), and an electrical bus 722 interconnecting the above components.

In one set of embodiments, disk drive 718 and/or removable media 706 may be configured to store a representation of one or more test patterns in accordance with embodiments of the present invention. Removable media 706 may correspond to any type of nonvolatile storage media or device, such as optical media (e.g., CD-ROM, DVD-ROM, Blu-Ray Disc, HD-DVD, etc.), nonvolatile flash media (e.g., CompactFlash, SD, MemoryStick. etc.), removable hard disks, or the like.

In various embodiments, image output driver 704 may be communicatively coupled with one or more wired user input devices 708 and/or one or more wireless user input devices 710. Wired user input device 708 may be any type of input device capable of communication via a wired connection/protocol (e.g., USB, Firewire, PS/2. etc.) such as a keyboard, mouse, a trackball, a track pad, a joystick, a game controller, a drawing tablet, microphone, and the like. Wireless user input device 710 may be any type of input device capable of communication via a wireless connection/protocol (e.g., infrared, radio frequency (RF), Bluetooth, etc.) such as a wireless remote control, a wireless keyboard, wireless mouse, a wireless game controller, and the like. In various embodiments, user input devices 708, 710 allow a user to select objects, icons, text and the like that graphically appear on a display via one or more input commands such as a button click or the like. In some embodiments, user input device 708 may include controls (e.g., buttons, switches, etc.) physically located on image output driver 704.

In further embodiments, one or more network/data interfaces 712 may be provided for communicatively coupling image output driver 704 with other devices. For example, network/data interface 712 may couple image output driver 704 with one or more computers on a computer network, a FireWire device, a Satellite cable connection, an optical cable, a wired-cable connection, or the like. Network/data interface 712 may include an Ethernet-based network adapter, modem (e.g., telephone, satellite, cable, ISDN, etc.), (asynchronous) digital subscriber line (DSL) unit, FireWire interface, USB interface, CableCard™ interface, and the like. Further, network/data interface 712 may be physically integrated on a motherboard of image output driver 704, or may be a software program such as soft DSL or the like.

In some embodiments, network/data interface 712 may be configured to receive analog or digital image data to be decoded and output to viewers via image output device 702. In one set of embodiments, network/data interface 712 may be configured to receive representations of one or more test patterns in accordance with the foregoing disclosure.

Although specific embodiments of the invention have been described, various modifications, alterations, alternative constructions, and equivalents are also encompassed within the scope of the invention. For example, while the present invention has been described with reference to certain test patterns, similar test patterns exhibiting alternative configurations are contemplated. Accordingly, the scope of the present invention should not be limited to the test patterns illustrated herein. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for testing the fidelity of intensity reproduction in an image output system comprising an image output device and one or more other devices, the method comprising:
receiving a representation of a test pattern, wherein the test pattern includes a plurality of anti-aliased features, and wherein the plurality of anti-aliased features are configured to provide visual evidence of a nonlinear transformation of the test pattern by the image output device or the one or more other devices, wherein the visual evidence includes an artifact that is formed from the placement of at least two of the plurality of anti-aliased features.

2. The method of claim 1, wherein the nonlinear transformation corresponds to a gamma transformation of the test pattern.

3. The method of claim 1, wherein the nonlinear transformation corresponds to image resampling of the test pattern in nonlinear space.

4. The method of claim 1, wherein the plurality of anti-aliased features comprises analytically anti-aliased features.

5. The method of claim 1 further comprising:
outputting the test pattern; and
receiving, in response to viewing the outputted test pattern, an adjustment of one or more image processing controls, wherein the adjustment of the one or more image processing controls is intended to reduce the visual evidence of the nonlinear transformation.

6. The method of claim 5, wherein the one or more image processing controls include a gamma control.

7. The method of claim 1, wherein the plurality of anti-aliased features include a first anti-aliased edge, wherein the first anti-aliased edge is configured to move within an output area of the image output device, over a time period such that the movement would be visible to a viewer of the image output device, at least in the presence of the nonlinear transformation.

8. The method of claim 7, wherein the movement of the first anti-aliased edge corresponds to a translation over the time period of the first anti-aliased edge.

9. The method of claim 7, wherein the movement of the first anti-aliased edge corresponds to a rotation over the time period of the first anti-aliased edge.

10. The method of claim 1, wherein the plurality of anti-aliased features include a first anti-aliased edge, wherein the first anti-aliased edge is slanted at a angle between a horizontal axis and a vertical axis of an output area of the image output device, and wherein the visual evidence of the nonlinear transformation corresponds to visible aliasing of the first anti-aliased edge.

11. The method of claim 10, wherein the plurality of anti-aliased features further includes a second anti-aliased edge parallel to the first anti-aliased edge, wherein the first anti-aliased edge and the second anti-aliased edge form a first anti-aliased line, and wherein the visual evidence of the nonlinear transformation corresponds to intensity variations along the first anti-aliased line.

12. The method of claim 11, wherein the plurality of anti-aliased features further includes a second anti-aliased line parallel to the first anti-aliased line, and wherein the visual evidence of the nonlinear transformation corresponds to artifacts caused by intensity variations along the first and second anti-aliased lines.

13. The method of claim 12 wherein an interline spacing between the first and second anti-aliased lines is configured to cyclically expand and contract over time, and wherein the artifacts appear to a viewer of the image output device to animate as the interline spacing expands and contracts.

14. The method of claim 1 wherein the test pattern is generated in real-time by the image output device or the one or more other devices.

15. The method of claim 1 wherein the representation of the test pattern is stored on a machine-readable medium.

16. The method of claim 1 wherein the image output device is selected from a group consisting of: a video display device and an image printing device.

17. The method of claim 1, wherein the plurality of anti-aliased features are lines and the artifact comprises a plurality of bands perpendicular to the anti-aliased lines.

18. The method of claim 17, wherein the plurality of bands substantially fills a display area set out for nonlinearity correction.

19. The method of claim 17, wherein the plurality of anti-aliased features are such that the plurality of bands rotate when at least two of the plurality of anti-aliased features move relative to each other.

20. The method of claim 1, wherein the visual evidence includes a plurality of artifacts that have a lower spatial frequency relative to the plurality of anti-aliased features.

21. A method for testing the fidelity of intensity reproduction in an image output system comprising an image output device and one or more other devices, the method comprising:
receiving a representation of a test pattern, wherein the test pattern is configured to exhibit low-frequency artifacts across an output area of the image output device in response to an nonlinear transformation of the test pattern by the image output device or the one or more other devices, wherein the low-frequency artifacts result from visual interactions due to placement of elements of the test pattern.

22. The method of claim 21, wherein the nonlinear transformation corresponds to a gamma correction or a gamma transformation of the test pattern.

23. The method of claim 21, wherein the nonlinear transformation corresponds to image resampling of the test pattern in nonlinear space.

24. The method of claim 21, wherein at least a portion of the low-frequency artifacts change over a time period such that the movement would be visible to a viewer of the image output device, at least in the presence of the nonlinear transformation.

25. The method of claim 21 further comprising:
outputting the test pattern; and
receiving, in response to viewing the outputted test pattern, an adjustment of one or more image processing controls, wherein the adjustment of the one or more image processing controls is intended to reduce the low-frequency artifacts.

26. The method of claim 21, wherein the test pattern is divided into a plurality of regions, and wherein each region in the plurality of regions is configured to display low-frequency artifacts unless a system gamma of the image output system corresponds to a specific value unique to said each region.

27. The method of claim 21, wherein the elements of the test pattern are lines and the low-frequency artifacts comprise a plurality of bands perpendicular to the lines.

28. The method of claim 27, wherein the plurality of bands substantially fills a display area set out for nonlinearity correction.

29. The method of claim 21, wherein the low-frequency artifacts comprise visual effects resulting from intensity variations along at least two of the elements of the test pattern and the visual effects are in a direction not parallel to those elements of the test pattern.

30. An apparatus for testing the fidelity of intensity reproduction in an image output system comprising an image output device and one or more other devices, the apparatus comprising:
a processing component configured to generate a representation of a test pattern, wherein the test pattern includes a plurality of anti-aliased features, and wherein the plurality of anti-aliased features are configured to provide visual evidence of a nonlinear transformation of the test pattern by the image output device or the one or more other devices, wherein the visual evidence includes an artifact formed from the placement of at least two of the plurality of anti-aliased features.

31. The apparatus of claim 30, wherein the plurality of anti-aliased features are lines and the artifact comprises a plurality of bands perpendicular to the anti-aliased lines.

32. The apparatus of claim 31, wherein the plurality of bands substantially fills a display area set out for nonlinearity correction.

33. The apparatus of claim 31, wherein the plurality of anti-aliased features are such that the plurality of bands rotate when at least two of the plurality of anti-aliased features move relative to each other.

34. The apparatus of claim 30, wherein the visual evidence includes a plurality of artifacts that have a lower spatial frequency relative to the plurality of anti-aliased features.

35. The apparatus of claim 30, wherein the artifact comprises visual effects resulting from intensity variations along the at least two of the plurality of anti-aliased features and the visual effects are in a direction not parallel to those anti-aliased features.

36. A non-transitory machine-readable medium, the non-transitory machine-readable medium having stored thereon a representation of a test pattern, wherein the test pattern is configured to be outputted by an image output system comprising an image output device and one or more other devices, wherein the test pattern includes a plurality of anti-aliased features, and wherein the plurality of anti-aliased features are configured to provide visual evidence of a nonlinear transformation of the test pattern by the image output device or the one or more other devices, wherein the visual evidence includes an artifact formed from the placement of at least two of the plurality of anti-aliased features.

37. The non-transitory machine-readable medium of claim 36, wherein the representation of the test pattern includes a plurality of instructions which, when executed by a processing component, cause the processing component to generate the test pattern.

38. The non-transitory machine-readable medium of claim 36, wherein the plurality of anti-aliased features are lines and the artifact comprises a plurality of bands perpendicular to the anti-aliased lines.

39. The non-transitory machine-readable medium of claim 38, wherein the plurality of bands substantially fills a display area set out for nonlinearity correction.

40. The non-transitory machine-readable medium of claim 38, wherein the plurality of anti-aliased features are such that the plurality of bands rotate when at least two of the plurality of anti-aliased features move relative to each other.

41. The non-transitory machine-readable medium of claim 36, wherein the visual evidence includes a plurality of artifacts that have a lower spatial frequency relative to the plurality of anti-aliased features.

42. The non-transitory machine-readable medium of claim 36, wherein the artifact comprises visual effects resulting from intensity variations along at least two of the plurality of anti-aliased features and the visual effects are in a direction not parallel to those anti-aliased features.

* * * * *